Figure 1:
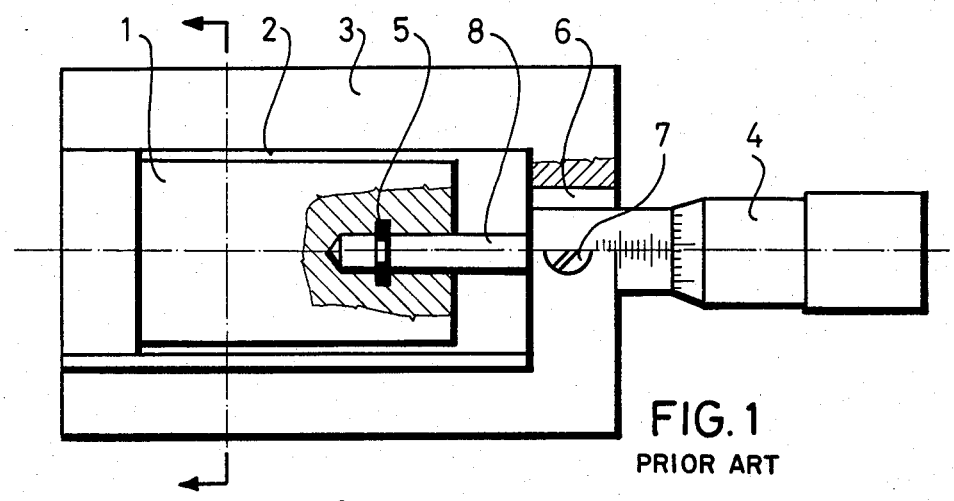
Figure 1A:
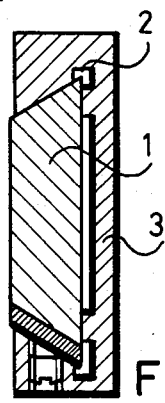

United States Patent [19]

Eisler

[11] 4,209,233
[45] Jun. 24, 1980

[54] LINEAR POSITIONING DEVICE, PREFERABLY FOR OPTICAL MEASUREMENTS

[75] Inventor: Gyula Eisler, Budapest, Hungary

[73] Assignee: MTA Központi Fizikai Kutató Intézete, Budapest, Hungary

[21] Appl. No.: 957,803

[22] Filed: Nov. 6, 1978

[51] Int. Cl.² ............................................. G02B 00/00
[52] U.S. Cl. ................................. 350/321; 248/466; 350/282
[58] Field of Search .................. 350/114, 321, 82, 69; 248/228, 298, 466, 593, 959, 602, 613, 624, 478, 480, 12–23; 356/256, 419, 429; 73/327, 620, 653; D10/33; 33/46

[56] References Cited

U.S. PATENT DOCUMENTS

| | | | |
|---|---|---|---|
| 3,208,447 | 9/1965 | Laszlo | 350/321 |
| 3,248,050 | 4/1966 | Dickson | 350/321 |
| 3,700,907 | 10/1972 | Meyer et al. | 350/321 |

FOREIGN PATENT DOCUMENTS 133864 1/1979 Fed. Rep. of Germany ........... 350/321

*Primary Examiner*—John K. Corbin
*Assistant Examiner*—B. W. de los Reyes

[57] ABSTRACT

A linear positioning device such as for optical measurements, having a base plate, an object carrier and a micrometer screw. Protruding extensions are formed on the base plate, a compensating member is arranged between the base plate and the object carrier. An actuating lever is inserted between the support of the object carrier and the operating micrometer screw. The compensating member is connected by leaf springs both to the extensions of the base plate and to the support of the object carrier, while said support is connected by a spiral spring to the extension of the base plate. The actuating lever of the device is connected by means of a transverse-spring-actuated joint to the extension of the base plate and by a leaf spring to the support of the object carrier and the operating micrometer screw which is led through one of the extensions of the base plate, is bearing up against the actuating lever.

2 Claims, 7 Drawing Figures

LINEAR POSITIONING DEVICE, PREFERABLY FOR OPTICAL MEASUREMENTS

The invention relates to a linear positioning device, preferably for optical measurements.

The structure of the known linear positioning devices can be characterized in that they are provided with an object carrier, fitted into a guide being furnished with frictional or rolling elements arranged on the base plate and formed with different profiles. The object carrier is put into motion by means of a directly connected operating micrometer-screw. The positioning devices thus constructed can be characterized by the jerky slide, by the abrasion due to friction, the contaminations of the lubricants on the frictional surfaces and by the operating micrometer-screw, being directly connected to the object carrier.

The structural characteristics described above are setting a rather strict upper limit to the accuracy of measuring and reproducible positioning, whereas the production of the devices requires a highly accurate surfacial fine-processing and a heat-treated material involving high expenses.

The drawbacks of the known positioning devices are, as follows:

(1) due to the jerky slide, abrasion and contamination characterizing the sliding or rolling guides, the accuracy of measurement is low;

(2) realizable accuracy of measuring is determined by the basic pitch of the operating micrometer-screw being in a direct connection with the object carrier;

(3) surfaces requiring lubrication cannot be used in vacuum and at extreme temperatures;

(4) production of the devices requires a highly accurate surfacial processing and a heat-treated material involving considerable expenses.

The aim of the invention has been to develop a linear positioning device at which the object carrier can be guided without friction and clearance, respectively. The micrometer-screw is directly connected to the object carrier by a transmission of high ratio, suspended freely of friction and clearance; as a consequence, compared to known solutions, the resulting measuring and reproducing accuracy will be higher by one order of magnitude, simultaneously accurate surfacial processing and heat-treated materials can be omitted, resulting in an econimical production.

The invention relates to a linear positioning device, preferably for optical measurements.

The essence of the invention lies in that between the base plate and the support of the object carrier a compensating member, while between the object carrier and the micrometer-screw an actuating lever has been arranged. The compensating member is connected by means of a leaf spring both to the base plate and the support of the object carrier, while the actuating lever—against which the micrometer-screw is bearing upon—is connected by means of a transverse spring actuated joint to the base plate and by an elastic joint to the support of the object carrier.

At a preferable embodiment of the invention on the base plate of the device there are perpendicularly protruding extensions. Between the base plate and the object carrier there is a compensating member arranged, whereas between the support of the object carrier, the object carrier and the operating micrometer-screw there is an actuating lever inserted. The compensating member is connected by means of leaf springs both to the extensions of the base plate and the support of the object carrier, while said support is connected by means of a spiral spring to the extension of the base plate. The actuating lever of the device is connected by means of a transverse-spring-actuated joint to the extension of the base plate and by means of leaf-spring to the support of the object carrier, at last the operating micrometer-screw—led through one of the extensions of the base plate—is bearing up against the actuating lever.

At a further preferable embodiment of the invention the device is provided with a second frame-shaped actuating lever, whereby the first actuating lever—against which the micrometer-screw is bearing upon—is surrounding the compensating member, and the support of the object carrier, while the second actuating lever encloses the support of said object carrier, simultaneously being connected by means of a transverse-spring actuated joint to one of the extensions of the base plate, by means of a leaf-spring-actuated push rod to the first actuating lever and by means of a leaf-spring to the support of the object carrier.

The linear positioning devices already known and according to the invention, respectively, will be described in details by means of the drawings enclosed, where FIGS. 1 and 1/a are illustrating a known positioning device provided with prismatic sliding guides and the cross-section thereof.

Figure 2A:
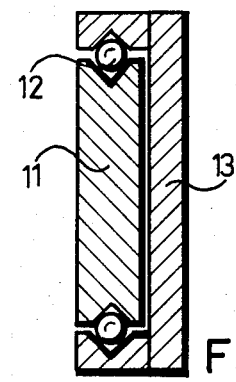
Figure 2:
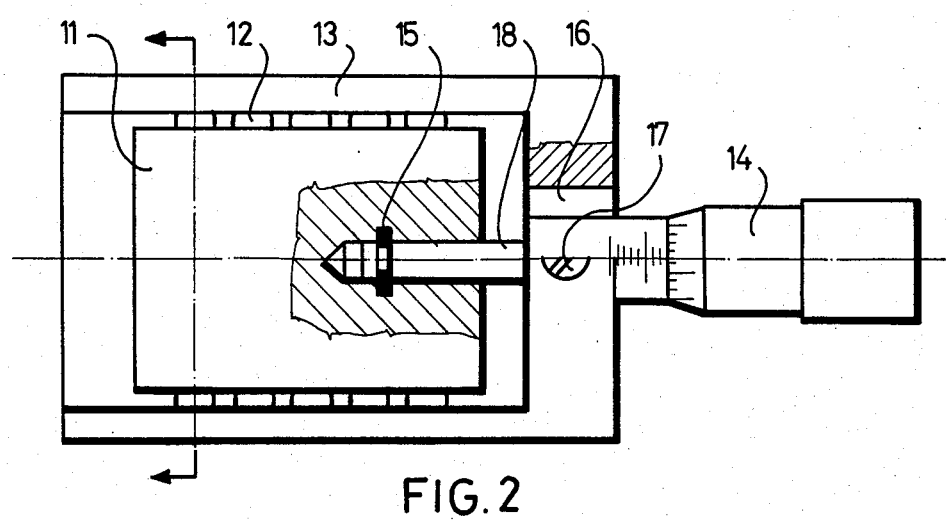
Figure 3:
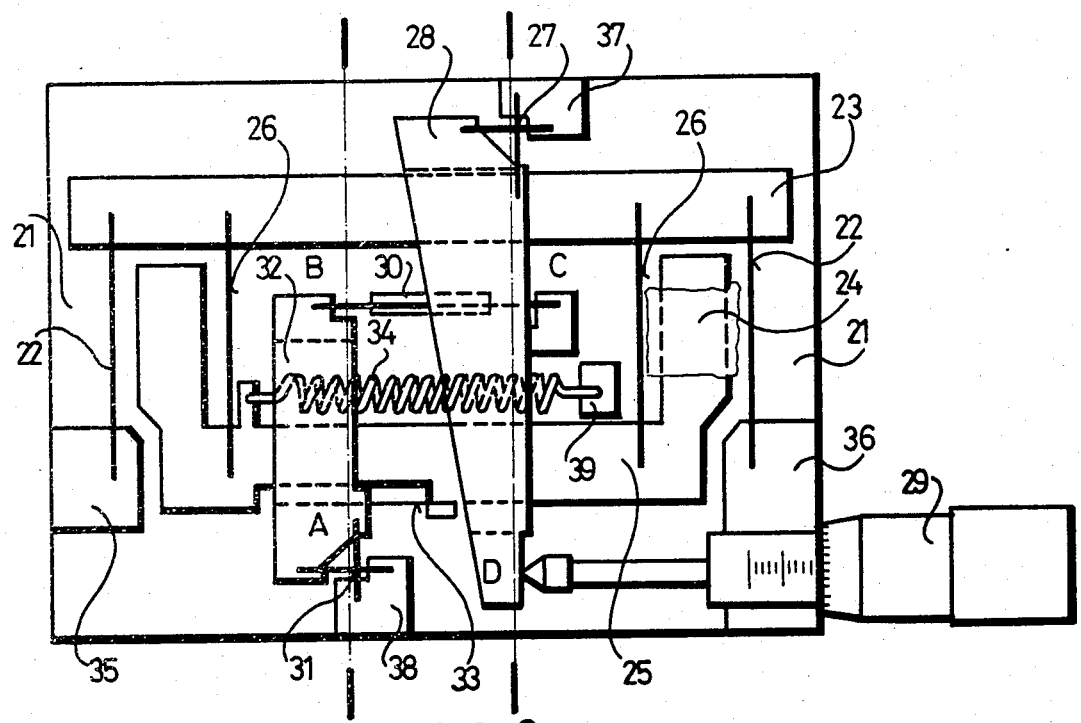
Figure 5:
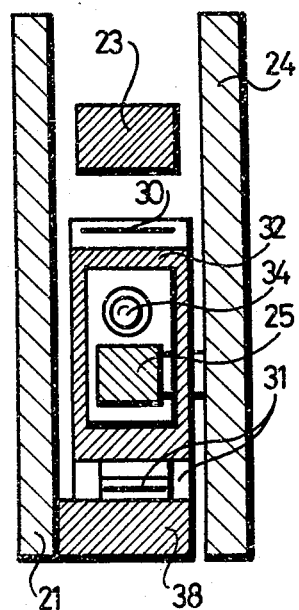
Figure 4:
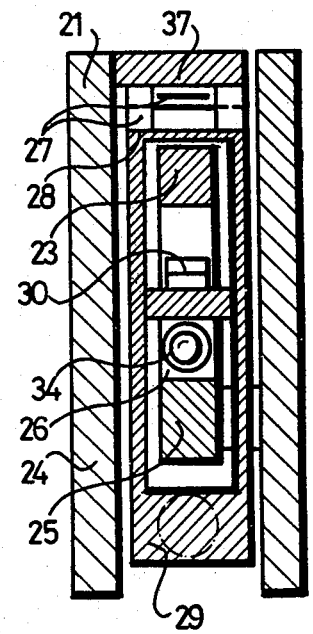

FIGS. 2 and 2/a are showing a known positioning device provided with a rolling ball-guide, FIG. 3 is showing an embodiment of the linear positioning device according to the invention, FIG. 4 the section of the first single-armed lever and FIG. 5 the section of the second single-armed lever.

In FIGS. 1 and 1/a the arrangement of the known positioning device provided with a prismatic frictional guide may be seen, where the object carrier 1 is connected through the guide 2 to the base plate 3. The object carrier is brought into motion by means of the operating micrometer-screw 4 fixed to the base plate 3. The operating micrometer-screw 4 is fitting into the slit sleeve 6 arranged in the bore of the object carrier 1 and the base plate and it is fixed to the base plate 3 by means of the retainer screw 7 through said sleeve. The actuating screw 8 of the operating micrometer-screw 4 is connected to the object carrier 1 by means of an inserted carrying ring 5.

At the embodiment illustrated in FIGS. 2 and 2/a, at the known positioning device provided with a rolling guide, the object carrier 11 is connected by means of the rolling elements 12 to the base plate 13. The object carrier 11 is brought into motion by the aid of the operating micrometer-screw 14. The positioning devices provided with the known sliding and rolling guides, respectively, are characterized by the jerky progressive motion and as a consequence, they are unsuitable for performing more accurate measurements and positioning. Also in this case, the operating micrometer-screw 14 is fixed by means of a retainer-screw 17 to object carrier 11 and to the base plate 13, through an inserted slit sleeve 16. An actuating screw 18 of the operating micrometer-screw 14 is connected by means of the carrying ring 15 to the object carrier 11 in a similar manner, as illustrated in FIG. 1.

In FIGS. 3, 4 and 5 an embodiment of the positioning device according to the invention has been illustrated by way of example. On the base plate 21 of the device extensions 35, 36, 37, 38 and 39 are perpendicularly protruding. To the first extension 35 and to the second extension 36 one end each of two leaf-springs 22 are attached, while a compensating member 23—moving forth on a parabolic path—is connected to the other ends of said springs.

On end each of the leaf-springs 26 is fixed in the compensating member 23, the other ends are attached to the linearly led support 25, to which the object carrier 24 carrying the unit to be measured and positioned has been fixed.

The forwarding point A of the pushing rod formed by the suitably selected geometrical arrangement of the friction—and clearancefree transverse leaf-springs and consisting of a second single-armed lever 32 suspended onto the transverse-spring-loaded joint 31 at the extension 38 of the base plate 21 is connected by means of a leaf-spring 33 to the support 25.

The point of application B of the second actuating lever is connected through the leaf-spring-loaded push rod 30 to the forwarding point C of the first actuating lever 28 formed by the suitably selected geometrical arrangement of the friction and clearancefree transverse leaf-springs and suspended onto the transverse-leaf spring-loaded joint 27 at the extension 37 of the base plate 21. The frame-shaped opening of the first actuating lever 28 encloses the support 25 and the compensating member 23. The operating micrometer-screw 29 fixed to the second extension 36 of the base plate 21 is connected to the point of application D of the first actuating lever 28. The stabilized clearancefree connection between the first actuating lever 28 and the operating micrometer-screw 29 could be achieved by means of the spiral spring 34 connected to the fifth extension 39 of the base plate 21.

The operation of the positioning device according to the invention is, as follows:

The base plate 21 is fixed onto the stand. The element, e.g. the optical mirror to be measured and positioned, respectively, in relation to the stand is fixed onto the object carrier 24. The momentary position of the element to be measured and positioned can be continuously read on the dial plate of the operating micrometer-screw 29 in such a manner, that the read values of displacement of the operating micrometer-screw 29 are reduced proportionally to the ratio of the first 28 and the second actuating lever 32. In case, if the ratio of said transmission system amounts to m=10, the base pitch of 0.01 mm of the operating micrometer-screw 29 corresponds to the displacement of 0.001 mm of the object carrier 24. Linear and elastic guidance of the object carrier 24 in relation to the base plate 21 can be achieved in such a manner that the compensating member 23 moving along on a parabolic path is suspended onto the leaf-springs 22 fixed to the first 35 and the second extension 36 of the base plate 21, whereby the leaf-springs 26 are fixed on said compensating member and the support is fixed to said leaf-springs.

The compensating member 23 and the support 25 arranged in the described manner are displaced on congruent parabolic paths turned-off by 180° in relation to each other. As a resultant of the two motions, the support 25 will move on a linear path in relation to the base plate 21.

The advantageous features of the positioning device according to the invention are, as follows:
(1) by the application of the invention the inaccuracy in reproduction due to the jerky sliding, abrasion and contaminations being characteristic of sliding and rolling guides can be eliminated, as a consequence, accuracy of reproduction may be increased by one order of magnitude;
(2) the positioning operating micrometer-screw applied is connected through the suitably selected transmission directly to the object carrier, as a consequence, precision of the pitch can be increased by one order of magnitude;
(3) taking into consideration, that lubrication of the guide becomes superfluous, the range of application broadens—e.g. it can be preferably used in vacuum equipments—, maintenance becomes easier, sensitivity to contaminations decreases;
(4) the positioning device can be produced using the traditional simple technology, thus production becomes economical.

What we claim is:

1. A linear positioning device, preferably to optical measurements, incorporating a base plate, an object carrier and a micrometer-screw, characterized in that on the base plate (21) protruding extensions (35, 36, 37, 38, 39) are formed, furthermore between the base plate (21) and the object carrier (24) there is a compensating member (23) and between the support (25) of the object carrier (24), the object carrier (24) itself and the micrometer-screw (29) there is an actuating lever (28), whereby the compensating member (23) is connected to the extensions (35, 36) of the base plate (21) by means of leaf-springs (22) and simultaneously it is connected by leaf-springs (26) to the support (25), while said support is connected by a spiral spring (34) to the extension (39) of the base plate (21), furthermore the actuating lever (28) of the device is connected by means of a transverse-spring-loaded joint (27) to the extension (37) of the base plate (21) and by the leaf-spring to the support of the object carrier and at last the micrometer-screw (29)—led through one of the extension (36) of the base plate (21)—is bearing up against the actuating lever (28).

2. Positioning device as claimed in claim 1, characterized in that the device is provided with a second frame-shaped actuating lever (32), whereby the first actuating lever (28)—against which the micrometer-screw is bearing upon—is enclosing the compensating member (23) and the support (25) of the object carrier only and it is connected by means of a transverse spring-loaded joint (31) to one of the extensions (38) of the base plate (21) and by a leaf-spring-loaded push rod (30) to the first actuating lever (28), simultaneously it is connected to the support (25) of the object carrier (24) by means of a leaf-spring (33).

* * * * *